United States Patent [19]

Chigodo et al.

[11] Patent Number: 5,473,293
[45] Date of Patent: Dec. 5, 1995

[54] HIGH-FREQUENCY SWITCH

[75] Inventors: Yoshikazu Chigodo; Harufumi Mandai, both of Nagaokakyo, Japan

[73] Assignee: Murata Manufacturing Co., Ltd., Japan

[21] Appl. No.: 173,823

[22] Filed: Dec. 27, 1993

[30] Foreign Application Priority Data

Dec. 26, 1992 [JP] Japan ................... 4-358137

[51] Int. Cl.⁶ ................................ H01P 1/15
[52] U.S. Cl. ........................ 333/104; 333/246
[58] Field of Search ................. 333/103, 104, 333/238, 246, 262

[56] References Cited

U.S. PATENT DOCUMENTS

| | | | |
|---|---|---|---|
| 3,138,768 | 6/1964 | Evans | 333/262 |
| 4,553,111 | 11/1985 | Barrow | 333/238 X |
| 4,821,007 | 4/1989 | Fields et al. | 333/238 |
| 4,854,038 | 8/1989 | Wiley | 333/238 X |
| 5,054,114 | 10/1991 | Erickson | 333/103 X |
| 5,193,218 | 3/1993 | Shino | 333/103 X |

FOREIGN PATENT DOCUMENTS 108301  4/1990  Japan ................... 333/104

*Primary Examiner*—Paul Gensler
*Attorney, Agent, or Firm*—Ostrolenk, Faber, Gerb & Soffen

[57] ABSTRACT

A high-frequency switch includes a multi-layer board or a laminate. The laminate is formed by laminating many dielectric layers 14. First and second strip lines, capacitors and so on are provided inside the laminate. Each of the capacitors is formed by the combination of the dielectric layer and two capacitor electrodes which sandwich the dielectric layer. Also, first and second diodes and so on are mounted on the laminate. Furthermore, external electrodes are formed on portions of four sides of the laminate.

9 Claims, 5 Drawing Sheets

F I G. 5
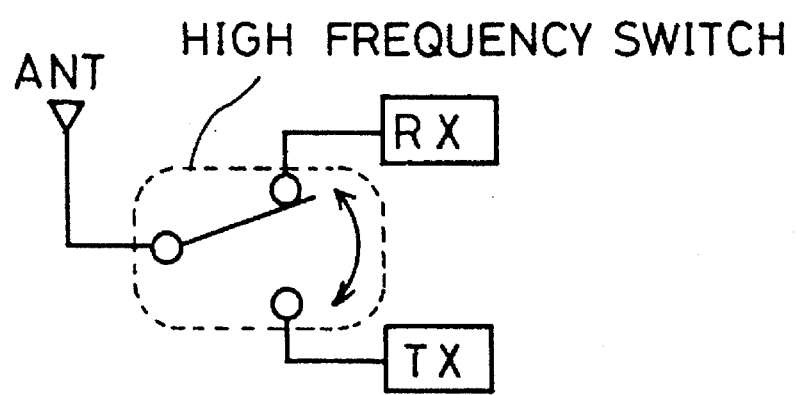

HIGH-FREQUENCY SWITCH

BACKGROUND OF THE INVENTION

1. Field of the Invention

The present invention relates to a high-frequency switch, and particularly, relates to a high-frequency switch for switching a signal path in a high-frequency circuit, for example, a digital portable telephone or the like.

2. Description of the Prior Art

As shown in FIG. 5, a high-frequency switch is used for switching a connection between a transmitting circuit TX and an antenna ANT and a connection between a receiving circuit RX and the antenna ANT in a digital portable telephone or the like.

FIG. 6 is a circuit diagram showing one example of a high-frequency switch which is a background of the present invention and to which the present invention is applied. The high-frequency switch is connected to an antenna ANT, a transmitting circuit TX and a receiving circuit RX. To the transmitting circuit TX, an anode of a first diode D1 is connected via a first capacitor C1. The anode of the first diode D1 is grounded via a series circuit of a first strip line SL1 and a second capacitor C2. Furthermore, to an intermediate point of the first strip line SL1 and the second capacitor C2, a first control terminal T1 is connected via a first resistor R1. To the first control terminal T1, a control circuit for switching the high-frequency switch is connected. Also, a cathode of the first diode D1 is connected to the antenna ANT via a third capacitor C3. To the third capacitor C3 connected to the antenna ANT, the receiving circuit RX is connected via a series circuit of a second strip line SL2 and a fourth capacitor C4. Also, to an intermediate point of the second strip line SL2 and the fourth capacitor C4, an anode of a second diode D2 is connected. Then, a cathode of the second diode D2 is grounded.

When transmitting with the high-frequency switch shown in FIG. 6, a positive voltage is applied to the first control terminal T1. By this voltage, the first diode D1 and the second diode D2 are turned ON. At this time, a D.C. component is blocked by the first-fourth capacitors C1–C4, so that the voltage applied to the first control terminal T1 is applied to only a circuit including the first diode D1 and the second diode D2. When the first diode D1 and the second diode D2 are ON, a signal from the transmitting circuit TX is transmitted to the antenna ANT, and then the signal is transmitted from the antenna ANT. Meanwhile, the transmitting signal from the transmitting circuit TX is not transmitted to the receiving circuit RX, since the second strip line SL2 is grounded by the second diode D2 and resonates, and an impedance observed from a connecting point A to the receiving circuit RX side is a very large.

On the other hand, when receiving, no voltage is applied to the first control terminal T1, so that the first diode D1 and the second diode D2 are OFF. Thus, a receiving signal from the antenna is transmitted to the receiving circuit RX and is not transmitted to the transmitting circuit TX side. In this way, by controlling a voltage applied to the first control terminal T1, transmitting and receiving can be switched.

FIG. 7 is a plan view showing one example of a conventional high-frequency switch having the circuit shown in FIG. 6. The high-frequency switch 1 includes a substrate 2, first and second strip lines 3a and 3b and lands are formed on one main surface of the substrate 2. First and second diodes 4a and 4b, first, second, third and fourth chip capacitors 5a, 5b, 5c and 5d, and a first chip resistor 6 are connected to the strip lines and the lands.

However, in the conventional high-frequency switch 1 shown in FIG. 7, it is generally required for the first and the second strip lines 3a and 3b, to have a length of ¼ of a wavelength of a transmitting signal or a receiving signal. A length of several tens of mm is required though it depends on a dielectric constant of the substrate 2 and so on. Thus a portion associated with the first and the second strip lines 3a and 3b has a large area on the substrate 2. Thus, in the high-frequency switch 1, it is a problem to miniaturize.

SUMMARY OF THE INVENTION

Therefore, it is a primary object of the present invention to provide a small high-frequency switch.

The present invention is related to a high-frequency switch connected to a transmitting circuit, a receiving circuit, and an antenna, for switching a connection between the transmitting circuit and the antenna and a connection between the receiving circuit and the antenna, comprising a first anode whose diode is connected to the transmitting circuit side and whose cathode is connected to the antenna side, a strip line connected between the antenna and the receiving circuit, and a second diode whose anode is connected to the receiving circuit side and whose cathode is connected to a grounding side, wherein the strip line is provided inside a multi-layer board, and the first diode and the second diode are mounted on the multi-layer board.

Since the strip line is provided inside the multi-layer board, and the first and the second diodes are mounted on the multi-layer board, the area of the high-frequency switch is decreased in its plan view.

According to the present invention, a small high-frequency switch is obtained.

The above and other objects, features, aspects and advantages of the present invention will become more apparent from the following detailed description of the embodiments with reference to the accompanying drawings.

BRIEF DESCRIPTION OF THE DRAWINGS

FIG. 5 is a block diagram showing a function of a conventions high-frequency switch.

DESCRIPTION OF THE PREFERRED EMBODIMENTS

Figure 1:
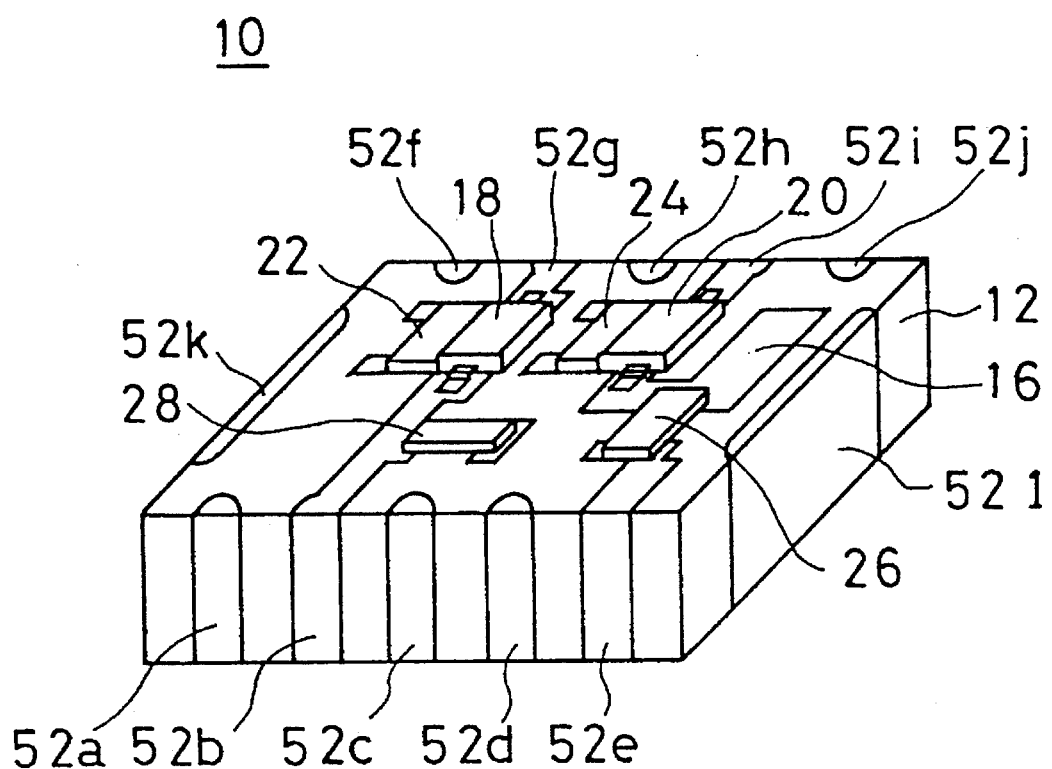
FIG. 1 is a perspective view showing one embodiment of the present invention.
Figure 2A:
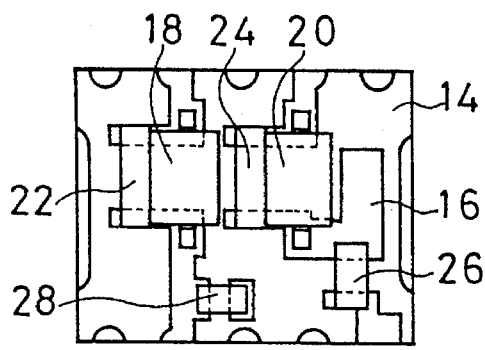
FIG. 2(A) through FIG. 2(G) are plan views showing each electrode on each dielectric layer and so on of the embodiment shown in FIG. 1.
Figure 2B:
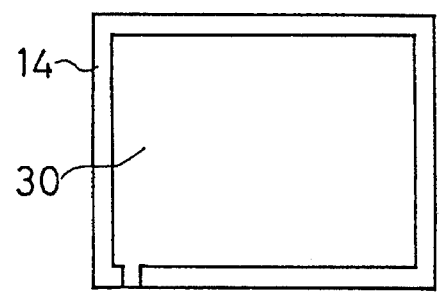
Figure 2C:
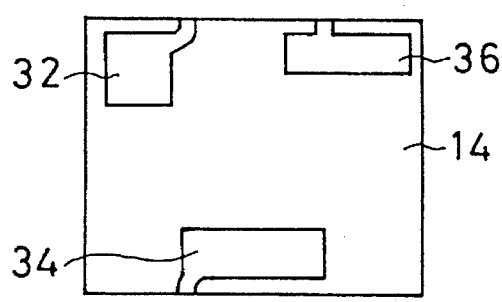
Figure 2D:
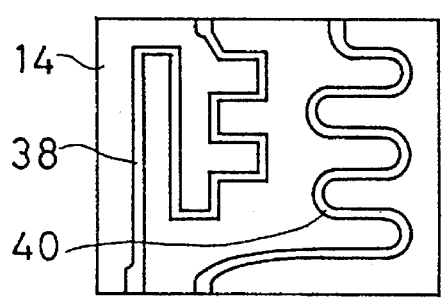
Figure 2E:
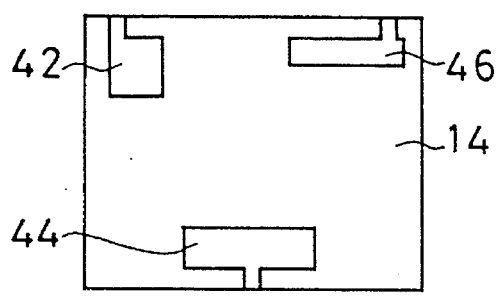
Figure 2F:
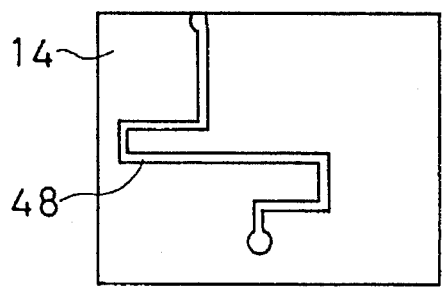
Figure 2G:
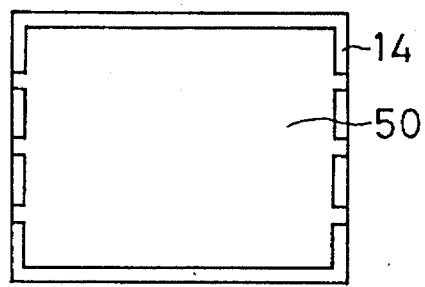
Figure 3:
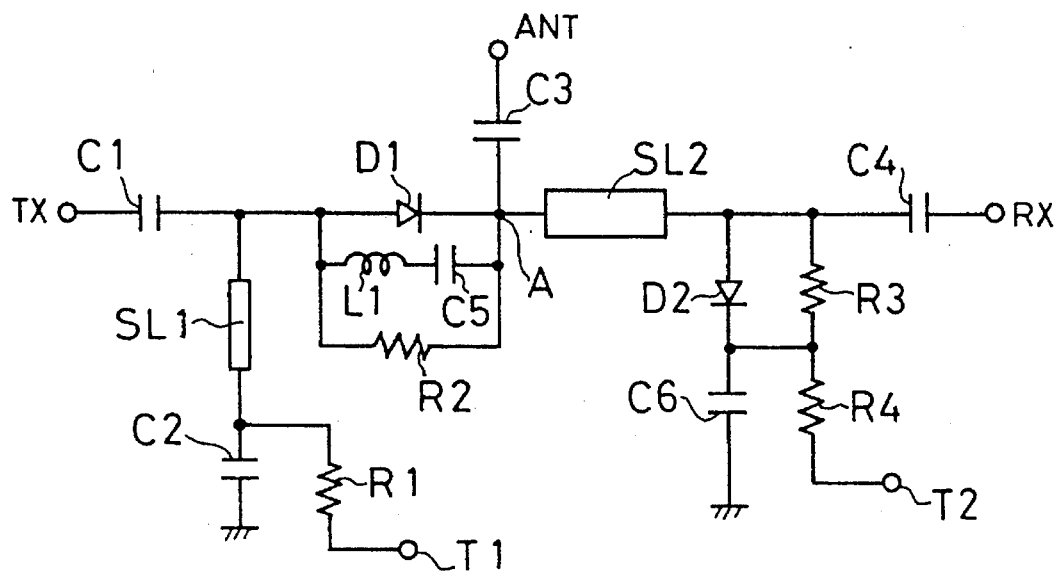
FIG. 3 is a circuit diagram of the embodiment shown in FIG. 1.

FIG. 1 is a perspective view showing one embodiment of the present invention, FIG. 2(A) through FIG. 2(G) are plan views showing each electrode on each dielectric layer and so on of the embodiment, and FIG. 3 is a circuit diagram of the embodiment.

Since one aspect of the high-frequency switch of the embodiment relates to its structure, and another aspect relates to its characteristic circuit, firstly, the circuit of the embodiment will be described with reference to FIG. 3 and so on. In the high-frequency switch of the embodiment, in contrast to the high-frequency switch shown in FIG. 6, particularly, a series circuit of an inductor L1 and a fifth capacitor C5, and a second resistor R2 are respectively connected to the first diode D1 in parallel. Furthermore, the cathode of the second diode D2 is grounded via a sixth capacitor C6. Also, a third resistor R3 is connected to the second diode D2 in parallel, and a second control terminal T2 is connected to the cathode of the second diode D2 via a fourth resistor R4. To the second control terminal T2, another control circuit for switching the high-frequency switch is connected.

When transmitting with the high-frequency switch shown in FIG. 3, a positive voltage is applied to the first control terminal T1. At this time, a forward voltage is applied to the first and the second diodes D1 and D2, so that the first and the second diodes D1 and D2 are respectively in their ON state. Accordingly, a transmitting signal from the transmitting circuit TX is transmitted from the antenna ANT, and is not transmitted to the receiving circuit RX side, since the second strip line SL2 is grounded by the second diode D2 and resonates, and an impedance observed from the connecting point A to the receiving circuit RX side is infinite.

Meanwhile, in the high-frequency switch shown in FIG. 3, when transmitting, though the first diode D1 and the second diode D2 are ON, inductance components exist in these diodes. When such an inductance component exists, an impedance observed from the connecting point A of the antenna ANT and the second strip line SL2 to the receiving circuit RX side is not infinite. In order to remove the influence of such an inductance component, a series resonance circuit is formed with the inductance component of the second diode D2 and the sixth capacitor C6. Thus, a capacitance C of the sixth capacitor C6 is shown in the following equation wherein the inductance component of the second diode D2 is $L_D$, and an operating frequency is f.

$C=1/\{(2\pi f)^2 \cdot L_D\}$

By setting the capacitance C of the sixth capacitor C6 in a condition defined by the above equation, when the second diode D2 is ON, the series resonance circuit is formed, and an impedance observed from the connecting point A of the antenna ANT and the second strip line SL2 to the receiving circuit RX side can be infinite. Thus, a signal from the transmitting circuit TX is not transmitted to the receiving circuit RX, so that an insertion loss between the transmitting circuit TX and the antenna ANT can be decreased. Furthermore, between the antenna ANT and the receiving circuit RX, a good isolation can be obtained. Further, when a voltage is applied to the first control terminal T1, a direct current is blocked by the first, second, third, fourth, fifth and sixth capacitors C1, C2, C3, C4, C5 and C6, so that it flows to only a circuit including the first diode D1 and the second diode D2, and does not influence other portions.

When receiving with the high-frequency switch shown in FIG. 3, a positive voltage is applied to the second control terminal T2. In this case, a voltage drop across the second resistor R2 is applied to the first diode D1 as a reverse direction bias voltage, and a voltage drop across the third resistor R3 is applied to the second diode D2 as a reverse direction bias voltage. Thus, the first and the second diodes D1 and D2 are reliably kept in their OFF state. Accordingly, a receiving signal is transmitted from the antenna ANT to the receiving circuit RX. At this time, there is a possibility of the receiving signal flowing to the transmitting circuit TX side, since capacitance components exist in the diodes. However, in the FIG. 3 high-frequency switch, the inductor L1 is connected to the first diode D1 in parallel. A parallel resonance circuit is formed with the inductor L1 and the capacitance component of the first diode D1. Thus, an inductance L of the inductor L1 is shown in the following equation wherein the capacitance of the first diode D1 is $C_D$, and an operating frequency is f.

$L=1/\{(2\pi f)^2 \cdot C_D\}$

By setting the inductance L of the inductor L1 in a condition according to the above equation, a good isolation can be obtained between the transmitting circuit TX and the antenna ANT. Thus, the receiving signal does not flow to the transmitting circuit TX side, so that an insertion loss between the antenna ANT and the receiving circuit RX can be decreased. Further, when a transmission line having a high impedance is used in place of the inductor L1, the same effects can be obtained.

Also, in the high-frequency switch shown in FIG. 3, for preventing a current from flowing via the inductor L1 when voltages are applied to the first and the second control terminals T1 and T2, the fifth capacitor C5 is connected to the inductor L1 in series. When the fifth capacitor C5 is connected, the above equation is amended in response to a capacitance thereof, of course.

In this way, the high-frequency switch shown in FIG. 3 has good characteristics in both transmitting and receiving.

Next, the structure of the high-frequency switch of the embodiment will be described with reference to FIG. 1, FIG. 2 and so on. As shown particularly in FIG. 1, the high-frequency switch 10 includes a multi-layer board or a laminate 12. The laminate 12 is formed by laminating many dielectric layers and so on.

On the top dielectric layer 14, as shown in FIG. 2(A), several lands, a capacitor electrode 16 of the sixth capacitor C6 and so on are formed. First and second diodes 18 and 20, chip resistors (or printing resistors) 22, 24 and 26 as the second, the third and the fourth resistor R2, R3 and R4, and a chip capacitor 28 as the fifth capacitor C5 are connected to the lands and the capacitor electrode 16.

On the second dielectric layer 14, as shown in FIG. 2(B), a capacitor electrode 30 of the second capacitor C2 is formed.

On the third dielectric layer 14, as shown in FIG. 2(C), capacitor electrodes 32, 34 and 36 of the first, the third and the fourth capacitors C1, C3 and C4 are formed.

On the fourth dielectric layer 14, as shown in FIG. 2(D), first and second strip lines 38 and 40 are formed.

On the fifth dielectric layer 14, as shown in FIG. 2(E), the other capacitor electrodes 42, 44 and 46 of the first, the third and the fourth capacitors C1, C3 and c4 are formed.

On the sixth dielectric layer 14, as shown in FIG. 2(F), a coil electrode 48 as the inductor L1 is formed.

On, the seventh dielectric layer 14, as shown in FIG. 2(G), a grounding electrode 50 as the other capacitor electrodes of the second and the sixth capacitors C2 and C6 is formed.

Then, the laminate 12 is formed by, for example, laminating the first dielectric layer 14 of FIG. 2(A) on the sixth dielectric layer 14 of FIG. 2(F), laminating the sixth dielectric layer 14 of FIG. 2(F) on the third dielectric layer 14 of FIG. 2(C), laminating the third dielectric layer 14 of FIG.

2(C) on the fifth dielectric layer 14 of FIG. 2(E), laminating the fifth dielectric layer 14 of FIG. 2(E) on the seventh dielectric layer 14 of FIG. 2(G), laminating the seventh dielectric layer 14 of FIG. 2(G) on the fourth dielectric layer 14 of FIG. 2(D), laminating the fourth dielectric layer 14 of FIG. 2(D) on another seventh dielectric layer 14 of FIG. 2(G), and laminating the another seventh dielectric layer 14 of FIG. 2(G) on the second dielectric layer 14 of FIG. 2(B).

Furthermore, on portions of four sides of the laminate 12, as shown in FIG. 1, twelve external electrodes 52a, 52b, 52c, 52d, 52e, 52f, 52g, 52h, 52i, 52j, 52k and 52l are formed. In this case, five external electrodes 52a–52e are formed on portions of one side of the laminate 12 in a widthwise direction, five external electrodes 52f–52j are formed on portions of the other side thereof in the widthwise direction, one external electrode 52k is formed on a portion of one side thereof in a lengthwise direction, one external electrode 52l is formed on a portion of the other side thereof in the lengthwise direction.

The external electrode 52a is connected to the capacitor electrode 30 and one end of the first strip line 38. The external electrode 52a is connected to a control circuit via a resistor (not shown) as the first resistor R1. Meanwhile, the resistor as the first resistor R1 may be formed on top dielectric layer 14 or the like.

The external electrode 52b is connected to one end of the first diode 18, one end of the chip resistor 22, one end of the chip capacitor 28, the capacitor electrode 34 and one end of the second strip line 40.

The external electrode 52c is connected to the capacitor electrode 44. The external electrode 52c is connected to the antenna ANT.

The external electrode 52e is connected to one end of the chip resistor 26. The external electrode 52e is connected to another control circuit.

The external electrode 52f is connected to the capacitor electrode 42. The external electrode 52f is connected to the transmitting circuit TX.

The external electrode 52g is connected to the other end of the first diode 18, the other end of the chip resistor 22, the capacitor electrode 32, the other end of the first strip line 38 and one end of the coil electrode 48.

The external electrode 52i is connected to the other end of the second diode 20, the other end of the chip resistor 24, the capacitor electrode 36 and the other end of the second strip line 40.

The external electrode 52j is connected to the capacitor electrode 46. The external electrode 52j is connected to the receiving circuit RX.

The external electrodes 52k and 52l are connected to the two grounding electrodes 50.

Meanwhile, the other end of the coil electrode 48 is connected to the other end of the capacitor 28, for example, by forming a through-hole (not shown) formed through the dielectric layer 14.

Thus, the high-frequency switch 10 shown in FIG. 1 has the circuit shown in FIG. 3.

In the high-frequency switch 10 shown in FIG. 1, since the first and the second strip lines 38 and 40 and so on are provided inside the laminate 12, and the first and the second diodes 18 and 20 and so on are mounted on the top dielectric layer 14 of the laminate 12, compared with a case where these parts and so on are mounted on one substrate, the area is decreased and miniaturized in its plan view. Also, the first and the second strip lines 38 and 40 may be formed on different dielectric layers of course.

Also, in the high-frequency switch 10 shown in FIG. 1, since the grounding electrode 50 is laminated on the first and the second strip line 38 and 40 so as to sandwich the dielectric layer therebetween, the strip lines 38 and 40 can be shortened in length, and miniaturization can be more increased in a plan view.

Figure 4A:
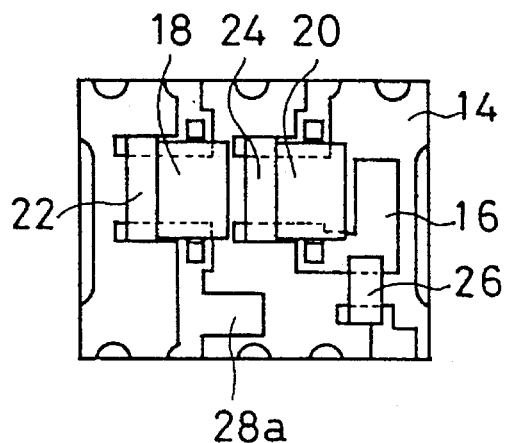
FIG. 4(A) and FIG. 4(B) are plan views showing another example of the fifth capacitor of the embodiment shown in FIG. 1.
Figure 4B:
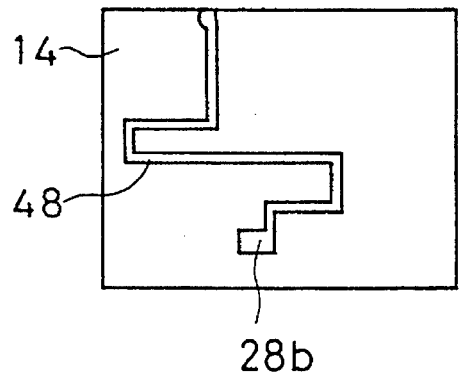

Meanwhile, though the chip capacitor 28 is used as the fifth capacitor C5 in the embodiment shown in FIG. 1, for example, by deleting the chip capacitor 28, and forming a capacitor electrode 28a connected to the one end of the first diode 18 on the first dielectric layer 14 as shown in FIG. 4(A), and forming a capacitor electrode 28b connected to the other end of the coil electrode 48 on the sixth dielectric layer 14 as shown in FIG. 4(B), then, the fifth capacitor C5 may be formed with the capacitor electrodes 28a, 28b and the first dielectric layer 14 therebetween.

Figure 6:
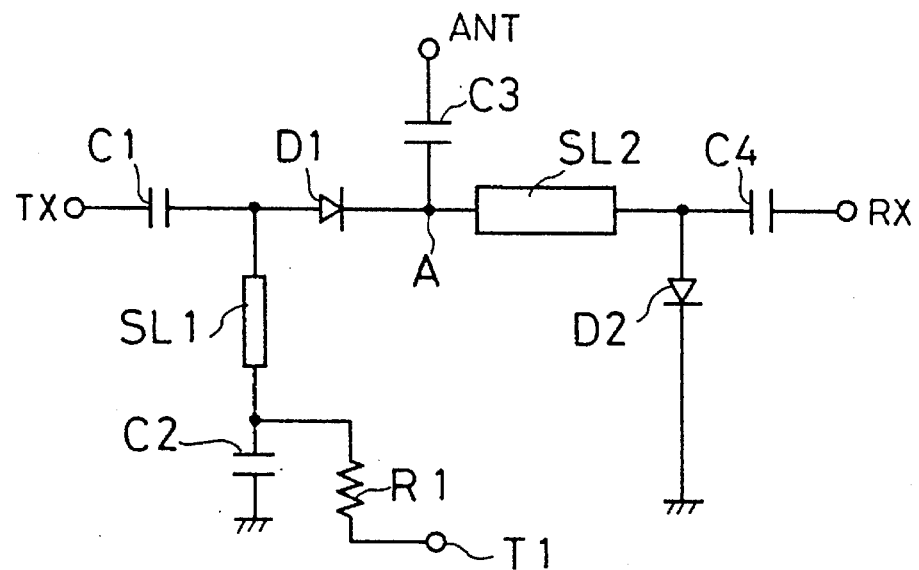
FIG. 6 is a circuit diagram showing one example of a high-frequency switch which is a background of the present invention and to which the present invention is applied.
Figure 7:
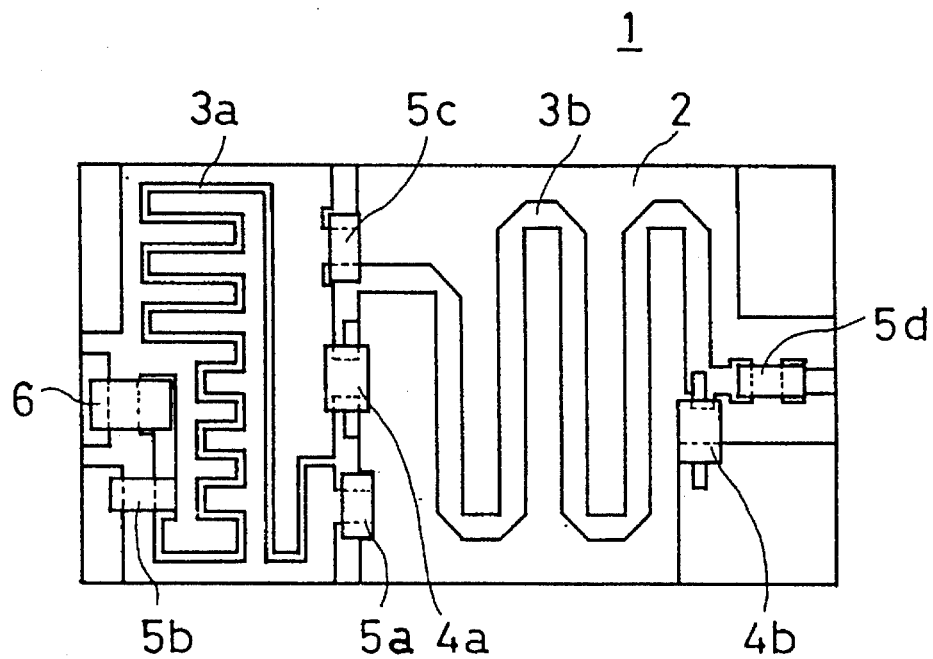
FIG. 7 is a plan view showing one example of a conventional high-frequency switch.

Also, though the embodiment shown in FIG. 1 has the circuit shown in FIG. 3, the present invention is applied to, for example, a circuit of another high-frequency switch having a strip line, first and second diodes, or the circuit shown in FIG. 6, besides the circuit shown in FIG. 3. Furthermore, it is free to modify the design within the purpose of the present invention, for example, the capacitor and the resistors formed on the laminate 12 may be buried.

It will be apparent from the foregoing that, while the present invention has been described in detail and illustrated, these are only particular illustrations and examples, and the present invention is not limited to these. The spirit and scope of the present invention is limited only by the appended claims.

What is claimed is:

1. A high-frequency switch connected to a transmitting circuit, a receiving circuit, and an antenna, for switching a connection between said transmitting circuit and said antenna, and a connection between said receiving circuit and said antenna, comprising:

a multi-layer board for supporting the components of the high-frequency switch;

a first diode whose anode is connected to said transmitting circuit side and whose cathode is connected to said antenna side;

a strip line connected between said antenna and said receiving circuit; and a second diode whose anode is connected to said receiving circuit side and whose cathode is connected to a grounding side, wherein said strip line being provided within said multi-layer board; and said first diode and said second diode mounted on a top layer of said multi-layer board, lands formed on said top layer and said first and second diodes connected to said lands.

2. A high-frequency switch according to claim 1, further comprising a series circuit of an inductor and a capacitor connected in parallel to said first diode.

3. A high-frequency switch according to claim 1, further comprising a capacitor being connected in series to said second diode.

4. A high-frequency switch connected to a transmitting circuit, a receiving circuit, and an antenna, for switching a connection between said transmitting circuit and said antenna, and a connection between said receiving circuit and said antenna, comprising:

a multi-layer board for supporting components of the high-frequency switch;

a first diode whose anode is connected to said transmitting circuit side and whose cathode is connected to said antenna side, said first diode mounted on said multi-layer board;

a strip line connected between said antenna and said receiving circuit, and said strip line being provided within said multi-layer board;

a second diode whose anode is connected to said receiving circuit side and whose cathode is connected to a grounding side, said second diode mounted on said multi-layer board; and a series circuit of an inductor and a capacitor, wherein said series circuit being connected in parallel to said first diode, and said inductor being provided within said multi-layer board.

5. A high-frequency switch according to claim 1 or claim 4, which further comprises an external electrode formed on a portion of a side of said multi-layer board.

6. A high-frequency switch according to claim 1 or claim 4, which further comprises another strip line connected to the anode of said first diode, wherein said other strip line is provided inside said multi-layer board.

7. A high-frequency switch according to claim 6, wherein the anode of said first diode is connected to said transmitting circuit via a first capacitor, said other strip is grounded via a second capacitor, the cathode of said first diode is connected to said antenna via a third capacitor, and the anode of said second diode is connected to said receiving circuit via a fourth capacitor, said first capacitor, said second capacitor, and said third capacitor, and said fourth capacitor are provided within said multi-layer board.

8. A high-frequency switch according to claim 7, wherein said multi-layer board includes laminated dielectric layers, at least one of said first capacitor, said second capacitor, and said third capacitor, and the said fourth capacitor is formed on a dielectric layer and two capacitor electrodes sandwich said dielectric layer.

9. A high-frequency switch connected to a transmitting circuit, a receiving circuit, and an antenna, for switching a connection between said transmitting circuit and said antenna, and a connection between said receiving circuit and said antenna, comprising:

a first diode whose anode is connected to said transmitting circuit side and whose cathode is connected to said antenna side;

a strip line connected between said antenna and said receiving circuit;

a second diode whose anode is connected to said receiving circuit side and whose cathode is connected to a grounding side;

a resistor connected in parallel to said first diode, another resistor connected in parallel to said second diode, and a control terminal provided for applying reverse direction bias voltages to said first diode and said second diode.

* * * * *